United States Patent
Wildhagen

(10) Patent No.: US 7,313,240 B2
(45) Date of Patent: Dec. 25, 2007

(54) NOISE REDUCTION IN A STEREO RECEIVER COMPRISING AN EXPANDER

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 1154 days.

(21) Appl. No.: 10/224,931

(22) Filed: Aug. 21, 2002

(65) Prior Publication Data

US 2003/0050021 A1 Mar. 13, 2003

(30) Foreign Application Priority Data

Aug. 24, 2001 (EP) ................................. 01120333

(51) Int. Cl.
*H04H 5/00* (2006.01)
(52) U.S. Cl. .......................................... 381/13; 381/11
(58) Field of Classification Search .................. 381/13, 381/94.1, 94.3, 11
See application file for complete search history.

(56) References Cited

U.S. PATENT DOCUMENTS 3,732,371 A 5/1973 Burwen 4,602,381 A 7/1986 Cugnini et al.

FOREIGN PATENT DOCUMENTS

| DE | 41 28 045 | 2/1993 |
| EP | 0 955 732 | 11/1999 |
| EP | 1 206 043 | 5/2002 |

OTHER PUBLICATIONS

"Improving the Signal-to-Noise Ratio and Coverage of FM Stereophonic Broadcasts." Emil L. Torick et al., J. Audio Enc. Soc.. vol. 33. No. 12. Dec. 1985. pp. 938-943.
"Noise Reduction in a Stereo Receiver." Aug. 24, 2001.
"Linear Phase Compander for FM Broadcast." Aug. 24, 2001.
"Method for Noise Reduction of a FM Signal," Aug. 24, 2001.
"An Introduction to Noise Reduction." Ken Gundry, www.dolby. com, Dec. 15, 1998. parts I-IX.

*Primary Examiner*—Stella Woo
(74) *Attorney, Agent, or Firm*—Oblon, Spivak, McClelland, Maier & Neustadt, P.C.

(57) ABSTRACT

A FM broadcast compander system is combined with a conventional denoising system suited for FM receiver, wherein a noise indicator is determined by a subtraction of the conventionally transmitted difference signal $U_d(z)$ from the additionally transmitted difference signal ($U_c(z)$) which is additionally transmitted according to the companding system. This system gives a noise reduction of 20 dB in a stereo FM broadcast receiver.

13 Claims, 1 Drawing Sheet

NOISE REDUCTION IN A STEREO RECEIVER COMPRISING AN EXPANDER

Figure 1:
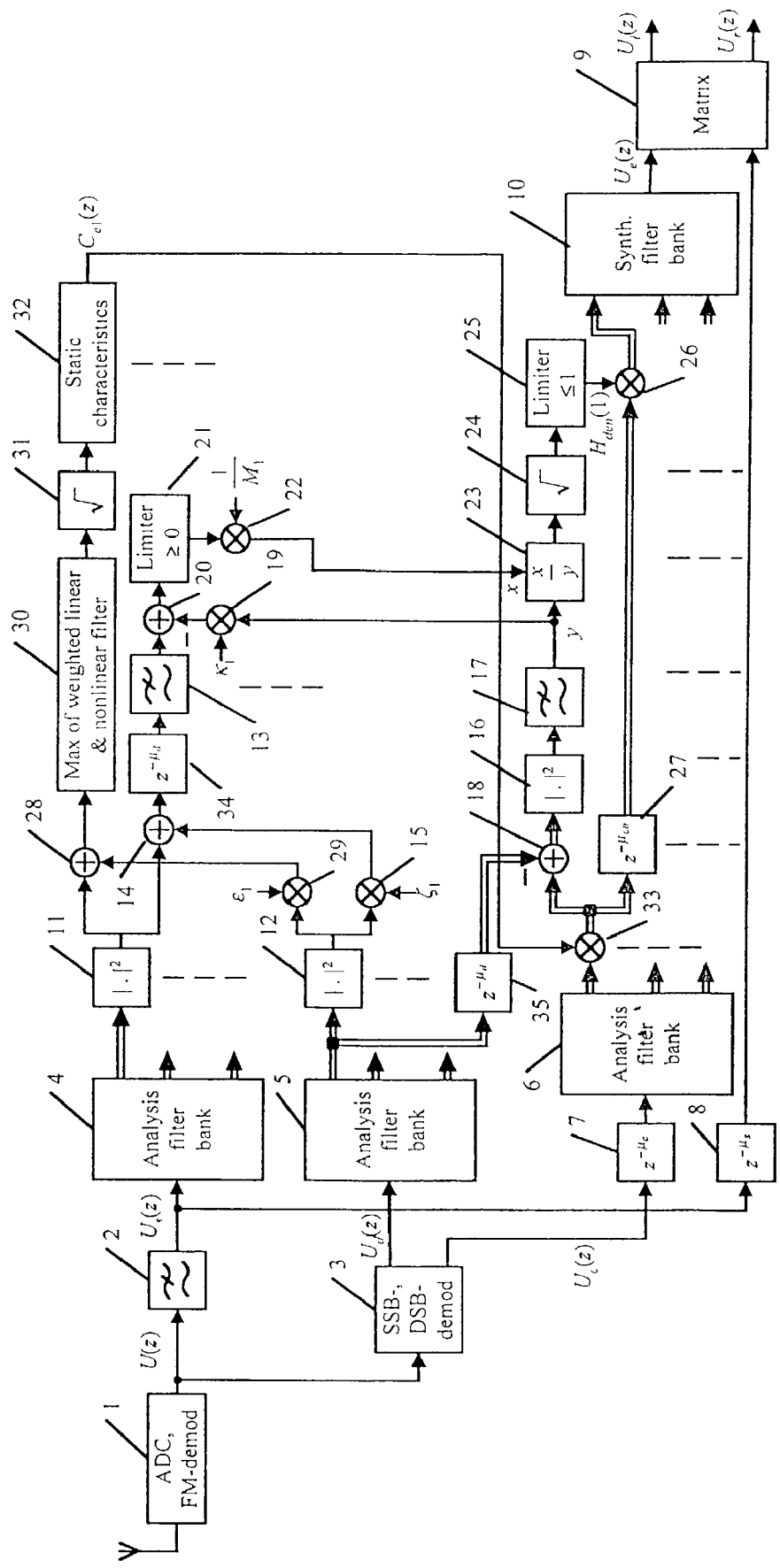

The present invention is related to a method for noise reduction of a FM signal, in particular to such a method comprising the step of companding the difference signal of a FM signal and transmitting the compressed difference signal additionally within the (normally transmitted) FM signal.

Companders are generally known. A compander compresses the difference signal before the channel or storage medium and expands after the channel or storage medium. Therewith, audible noise distortions which are added to the transmitted or stored signal are reduced by such a compander. One of the best known companders for tape recording purposes is the Dolby-B-type noise reduction system. Such a syllable compander calculates the slowly varying envelope amplitude of the audio signal and compresses/expands the audio signal according thereto. A detailed description of companders and in particular of the Dolby NR (Noise Reduction) system can be found under "http://www.dolby.com/ken".

Further, the usage of a compander for FM broadcast is also generally known. In this field a noise reduction of the difference signal noise is achieved by compressing the difference signal in the transmitter and transmitting the compressed difference signal additionally within the normally transmitted FM signal. According to Emil L. Torick and Thomas B. Keller "Improving the signal-to-noise ratio and coverage of FM stereophonic broadcasts", J. Audio Enc. Soc., Vol. 33, No. 12, New York, 1985 December, pages 938-943, presented under the title "FMX Studio Broadcast System" at the 79th convention of the Audio Engineering Society, 1985, October 12-16, the compressed difference signal is added to the in-quadrature component of the modulated 38 kHz carrier, i.e. the compressed difference signal is transmitted in quadrature to the uncompressed difference signal. Alternatively, DE 41 28 045 A1 describes to add the compressed difference signal to the lower sideband of the modulated 38 kHz carrier and to subtract the compressed difference signal from the upper sideband of the modulated 38 kHz carrier before transmission of the so modified multiplex signal. A mathematical analysis of both described modulation systems leads to the finding that the better and therefore preferred solution is the method described in DE 41 28 045 A1.

However, both shown companding systems for FM broadcast show noise distortions in the reproduced audio signal.

It is therefore the object underlying the present invention to provide an improved method for noise reduction of a FM signal.

This object is achieved with the method for noise reduction defined in independent claim 1. A FM receiver according to the present invention is defined in independent claim 6. Preferred embodiments thereof are respectively defined in the following dependent sub-claims. Computer program products according to the present invention are defined in claims 12 and 13.

A method for noise reduction of a FM signal comprising the step of companding the difference signal and transmitting the compressed difference signal additionally therewith within the FM signal according to the present invention comprises an additional denoising in the FM receiver in which a noise indicator is determined by a subtraction of the difference signal from the additionally transmitted difference signal.

Correspondingly, a FM receiver which comprises an expander for expanding a received compressed difference signal which is transmitted additionally within a received FM signal according to the present invention comprises an additional denoising circuit in which a noise indicator is determined by a subtraction of the difference signal from the additionally transmitted difference signal.

Denoising circuits which denoise a FM signal on the basis of a noise indicator, in particular a noise indicator indicating the noise of the difference signal, are known, e.g. from the European patent application "Noise Reduction in a Stereo Receiver" with application No. 00 124 466.4 submitted by the applicant on Nov. 8, 2000 which content is herewith incorporated into the specification by reference.

The teaching of the present invention allows to advantageously combine such a noise reduction (in particular that disclosed in the before referenced European patent application) with an FM broadcast system using the companding technology. A direct combination of a broadcast receiver working according to the companding technology, i.e. a broadcast receiver comprising an expander, with a noise reduction system as disclosed in the before referenced European patent application is not possible, since the before referenced European patent application teaches to determine a noise indicator on the basis of the in quadrature component of the modulated helper carrier, i.e. the signal component in quadrature to the transmitted difference signal, and due to the fact that this signal component is used for the transmission of the additionally transmitted compressed difference signal according to the companding technology, as it is described in the above referenced paper of Emil L. Torick and Thomas B. Keller and in DE 41 28 045 A1.

The noise reduction using the companding technology as it is e.g. described in the applicant's parallel European patent application "Method for Noise Reduction of a FM Signal" and "Linear Phase Compander for FM Broadcast" which content is herewith respectively incorporated into this specification by reference and which companding systems can advantageously be used for the noise reduction method and the FM receiver according to the present invention is limited to a certain value, for example 14 dB, to avoid audible distortions in conventional (existing) FM receivers.

According to the present invention a further noise reduction is achieved by the combination of a compander broadcast system with a denoising system as it is disclosed in the applicant's European patent application with application No. 00 124 466.4 under consideration that a noise indicator is determined by a subtraction of the difference signal from the additionally transmitted difference signal, i.e. the difference signal subjected to the companding. The combination of the compander and the denoising system according to the present invention allows a noise reduction of about 20 dB in a new generation of stereo FM broadcast receivers without distortions in conventional (existing) FM receivers.

According to the present invention preferably the received compressed difference signal is expanded before the (conventionally transmitted) difference signal is subtracted.

Also preferably according to the present invention the additional denoising is a frequency selective stereo to mono blending wherein one respective noise indicator is determined for every subband determining the frequency selectivity.

In this case, preferably every subband of the additionally transmitted stereo difference signal is attenuated which noise component lies above a signal component of a subband of the audio signal corresponding to that of the additionally transmitted stereo difference signal so that the noise component of the subband of the additionally transmitted stereo difference signal lies below the respective absolute threshold of masking (of said subband).

In the latter case a noise component of a subband of the additionally transmitted stereo difference signal is preferably determined by determining the noise power of the noise indicator of said subband and/or a signal component of the audio signal is preferably determined as signal power of a combination of a corresponding subband sum signal and a corresponding subband difference signal or the subband of the additionally transmitted stereo difference signal.

Correspondingly, the additional denoising circuit comprised in an FM receiver according to the present invention preferably performs a frequency selective stereo to mono blending by controlling an attenuation of subbands of the expanded additionally transmitted difference signal, wherein one respective noise indicator is determined for every subband. The frequency selectivity is determined based on the number and respective width of the subbands.

In this case, the additional denoising circuit according to the present invention preferably comprises a comparison circuit to determine an attenuation factor for a respective subband of the expanded additionally transmitted difference signal by comparing the noise component of that subband to the signal component of the corresponding subband of the (whole) audio signal.

Further preferably, the FM receiver according to the present invention comprises a noise power determination unit to determine the noise component of a subband of the additionally transmitted stereo difference signal by determining the noise power of the noise indicator of said subband.

Alternatively or additionally, the FM receiver according to the present invention comprises a signal power determination unit to determine the signal component of a subband of the audio signal of a combination of a corresponding subband sum signal and a corresponding subband difference signal.

Alternatively thereto, the FM receiver according to the present invention comprises a signal power determination unit to determine the signal component of a subband of the audio signal on the basis of a combination of the signal power of a corresponding subband sum signal and the signal power of the subband of the additionally transmitted stereo difference signal.

Therewith, as stated above, the method for noise reduction of a FM signal as well as the FM receiver according to the present invention allow a combination of the FM signal companding technology with a further noise reduction method, preferably a frequency selective stereo to mono blending, further preferably based on psycho-acoustical models.

Further features and advantages of the noise reduction method and FM receiver according to the present invention will become apparent from the following description of a preferred embodiment thereof taken in conjunction with FIG. 1 which shows an exemplary preferred embodiment of a FM receiver according to the present invention.

The exemplary preferred embodiment of a FM receiver according to the present invention combines the technology disclosed in the applicant's parallel European patent application "Linear Phase Compander for FM Broadcast" with a noise reduction in a stereo receiver as disclosed in EP-A-00 124 466.4. Therefore, the band splitting of the received FM signal U(z), i.e. of the stereo sum signal $U_s(z)$, the stereo difference signal $U_d(z)$, and the compressed additionally transmitted stereo difference signal $U_c(z)$, is performed like it is disclosed in both referenced specifications, i.e. according to linear phase and critical bandwidth of the human auditory system considerations. Further, the expander gain is basically determined according to the teaching given in the above referenced applicant's parallel European patent application "Method for Noise Reduction of a FM Signal".

As mentioned before, the content of all three before mentioned European patent applications is incorporated into this specification by reference and a combination of the teachings disclosed therein together with the additional teaching given in this specification leads to the preferred embodiment of the present invention. Therefore, reference to said 3 documents is also given here for a detailed description of specific circuit parts.

The FM receiver according to the present invention shown in FIG. 1 receives the transmitted FM signal which might be generated according to the applicant's parallel European patent application "Linear Phase Compander for FM Broadcast" as mentioned before, via an antenna and generates the stereo multiplex signal U(z) with an FM demodulator 1 which includes an analogue to digital converter. The stereo sum signal $U_s(z)$ is divided from the stereo multiplex signal U(z) by a lowpass filter 2 and is fed to a first analysis filter bank 4 which splits the stereo sum signal $U_s(z)$ into subband signals thereof, corresponding to the band splitting in the transmitter which might be determined according to the critical bandwidth of the human auditory system.

A single sideband and double sideband demodulator 3 demodulates the conventionally transmitted stereo difference signal $U_d(z)$ and the additionally transmitted compressed stereo difference signal $U_c(z)$ from the stereo multiplex signal U(z). The conventionally transmitted stereo difference signal $U_d(z)$ is fed to a second analysis filter bank 5 which splits said signal into subband signals corresponding to the splitting of the first analysis filter bank 4. The additionally transmitted compressed stereo difference signal $U_c(z)$ is fed to a third analysis filter bank 6 via a delay element 7 which delays said signal by $\mu_c$. The third analysis filter bank 6 splits the delayed additionally transmitted compressed stereo difference signal $U_c(z)$ into subbands corresponding to the splitting of the first and second analysis filter banks 4, 5. The additionally transmitted compressed stereo difference signal $U_c(z)$ which is split into subbands gets processed according to the following description to generate a noise reduced expanded stereo difference signal $U_e(z)$ which is input together with the stereo sum signal $U_s(z)$ which is delayed by a second delay element 8 with delay $\mu_s$ into a matrix circuit 9 which generate the left and right audio channel signals $U_l(z)$, $U_r(z)$. The delay $\mu_s$ of the second delay element 8 corresponds to the delay $\mu_c$ of the first delay element 7 and the processing time of the filtering and processing of the additionally transmitted stereo difference signal $U_c(z)$ so that the matrix circuit 9 receives a stereo sum signal and stereo difference signal which correspond in time.

The processed and expanded stereo difference signal $U_e(z)$ is obtained by combining all expanded and processed subband signals of the delayed additionally transmitted compressed stereo difference signal $U_c(z)$ with a synthesis filter bank 10. In case the subband signals are not sampling rate decimated, the synthesis filter bank 10 can be replaced by an adder. However, preferably the subband signals are sampling rate decimated complex baseband signals.

For the sake of simplicity the expanding and difference signal attenuation circuitry for processing the subband of the additionally transmitted compressed stereo difference signal $U_c(z)$ is shown in FIG. 1 for one subband only. This circuitry is of course necessary for every subband of the additionally transmitted compressed stereo difference signal $U_c(z)$, as it is indicated by dashed lines in FIG. 1.

For determining the attenuation factor of an expanded subband signal of the additionally transmitted stereo difference signal $U_c(z)$ basically its noise power is compared to the signal power of the corresponding subband of the audio signal. In FIG. 1 the signal power of the corresponding (complex) subband of the audio signal is determined by squaring the absolute value of the corresponding stereo sum signal $U_s(z)$ subband in a first absolute value squaring unit 11, squaring the absolute value of the corresponding stereo difference signal $U_d(z)$ subband in a second absolute value squaring unit 12 and lowpass filtering 13 the added 14 resulting signals which are delayed by $\mu_d$ in a fourth delay element 34 wherein the signal resulting from the difference signal subband is scaled 15 by a factor $\zeta$, in FIG. 1 $\zeta_1$, since the circuitry is only shown for the first subband. The delay by $\mu_d$ is necessary to compensate the delay $\mu_c$ introduced by the first delay element 7. From the signal power of the corresponding audio signal subband the noise power of the stereo difference signal which is scaled 19 by a second scaling factor $\kappa$, in FIG. 1 $\kappa_1$ since the circuitry is only shown for the first subband, is subtracted 20 before the resulting signal is fed via a limiter 21 through which only positive signals can pass and a third scaling unit 22 scaling the limited resulting signal by 1/M, in FIG. 1 $1/M_1$ since the circuitry is only shown for the first subband, to a comparing unit 23 which also receives the noise power of the stereo difference signal subband.

The comparing unit 23 divides the calculated signal power by the determined noise power and feeds the quotient signal to a square root building unit 24 which resulting signal is used as attenuation signal after having passed a limiter 25 through which only signals smaller or equal to 1 can pass. The attenuation signal $H_{den}$, in FIG. 1 $H_{den}(1)$ since the circuitry is only shown for the first subband, is fed to a first multiplier 26 which receives the expanded subband signal of the additionally transmitted compressed stereo difference signal $U_c(z)$ which is delayed by $\mu_{ctr}$ via a third delay element 27. The resulting attenuated expanded stereo difference subband signal is fed to the synthesis filter bank 10. as indicated before.

The attenuation signal $H_{den}$ might further be scaled as proposed in the applicant's parallel European Patent application "Noise Reduction in a Stereo Receiver" submitted at the same day as this Patent application which content is herewith incorporated into this specification.

The noise power is calculated by subtracting the corresponding stereo difference signal $U_d(z)$ subband which is delayed by $\mu_d$ in a fifth delay element 35 to compensate the delay $\mu_c$ introduced by the first delay element 7 from the respective expanded additionally transmitted stereo difference signal $U_c(z)$ subband with a subtracter 18 building the squared absolute value thereof in a third absolute value and squaring unit 16 and lowpass filtering 17 the resulting signal.

The expander gain is ideally the inverted compressor gain, as it is described in the applicant's parallel European Patent applications "Method for Noise Reduction of a FM Signal" and "Linear Phase Compander for FM Broadcast". Therefore, the expander gain which expands the additionally transmitted compressed stereo difference signal $U_c(z)$ subband by a second multiplier 33 is determined according to a combination of the stereo sum signal $U_s(z)$ subband and the stereo difference signal $U_d(z)$ subband. This combination is obtained by adding the output signal of the first absolute value and squaring unit 11 and the scaled 29 by a scaling factor $\epsilon$, in FIG. 1 $\epsilon_1$ since the circuitry is only shown for the first subband, output signal of the second absolute value and squaring unit 12 with an adder 28. In a following filtering 30 wherein here for example the maximum of a weighted linear and non-linear filtering is determined, the square root 31 is taken and the expander gain $C_e(z)$ in FIG. 1 $C_e1(z)$ since the circuitry is only shown for the first subband, is determined based on static characteristics 32.

As stated also above, the combination of the compander for FM broadcast and the denoising system according to the present invention allows a further noise reduction in an advanced FM receiver. The additional noise reduction is achieved by a denoising of the expanded difference signal.

The denoising system in an advanced FM receiver according to the present invention is basically similar to the denoising system in a conventional FM receiver. The signal power is calculated as is described for the FM receiver of EP-A-00 124 466.4. The calculation of the noise power is different because the quadrature component of the helper signal is modulated. Therefore, according to the present invention, the noise indication signal is calculated by the subtraction of the difference signal from the expanded difference signal. The expanded difference signal and the difference signal contain the same information, so the difference of both signals represents mainly the additive noise distortions.

Ideally, the compressed difference signal $U_c(z)$ must be expanded before the additive noise distortions are calculated. In this case, the advanced receiver according to the present invention would consist of 4 analysis filter banks and 2 synthesis filter banks. Two analysis filter banks are required for the calculation of the signal power of the sum and the difference subband signals. One analysis/synthesis filter bank pair is required for the expansion of the compressed signal. A second analysis/synthesis filter bank pair is required for the denoising of the expanded difference signal.

In the exemplary preferred embodiment of the present invention shown in FIG. 1 both analysis/synthesis filter bank pairs of the expander and the denoising system are combined to one analysis/synthesis filter bank pair.

FIG. 1 depicts a simplified block diagram of an FM receiver according to the present invention with a combined expansion and denoising filter bank. The combined expansion and denoising in one filter bank leads to distortions in the noise indication signal. The noise indication signal is required for the denoising of the expanded difference signal. In the following, it will be shown that the distortions in the noise indication signal are low, so they do not affect the performance of the denoising system.

According to FIG. 1, the noise indication subband signals are calculated by the subtraction of the subband difference signals from the expanded subband difference signals. The resulting noise indication signal is free of crosstalking distortions from the difference signal if the following two items are fulfilled:
1. The analysis filter banks for the subband filtering of the conventional difference signal and the compressed difference signal are identical.
2. The expander gains of adjacent subband signals of a considered subband are identical to the expander gain of the considered subband itself.

The first item can be fulfilled by an appropriate design of the compander. Therefore, the audio filter bank for the band splitting of the compressed difference signal and the control filter bank for the band splitting of the difference signal are identical, e.g. to the 26-channel hybrid filter bank described in the applicant's parallel European application "Linear Phase Compander for FM Broadcast". The control filter bank for the subband filtering of the sum signal might consist of subband filters with a higher bandwidth than the audio filter bank in order to minimize the influence of the filter banks characteristic to the compression of the difference signal.

The second item can not be fulfilled. Considering a noise indication a subband signal n, it is only free of crosstalking difference signal components in case the expander gain of the adjacent subband signals n+1, n−1 is identical to the expander gain of the subband n. Thinking about the overall compander, this requirement would result in a broadband compander. However, in case of different compressor gains of adjacent subbands, the crosstalking components in the noise indication signal originate from the spectral components of the compressed difference signal that are located in the transition region to adjacent subbands. However, a different compressor gain of adjacent subbands is only possible in case the transition region contains little signal power. As a result, the power of the signal components included in the noise indication signal is low compared to the signal power and does therefore, affect the denoising of the expanded difference signal only to a small extent.

The attenuation of the expanded subband difference signals might be calculated similarly to the denoising system described in EP-A-00 124 466.4 or as in the applicant's parallel European Patent application "Noise Reduction in a Stereo Receiver", only the noise indication signal is determined according to the present invention.

The reliability of the signal power estimation in the denoising system can be increased by a calculation of a signal power estimation based on the sum signal and the expanded difference signal instead of the sum signal and the conventional difference signal.

The invention claimed is:

1. A method for noise reduction of an FM signal, comprising the step of:
   companding a difference signal;
   transmitting a compressed difference signal additionally within the FM signal; and
   reducing a noise of the FM signal by using a noise indicator determined by subtracting the difference signal from the compressed difference signal.

2. The method according to claim 1, further comprising the step of:
   expanding the compressed difference signal before the difference signal is subtracted.

3. The method according to claim 1, wherein the reducing step comprises a frequency selective stereo to mono blending, one respective noise indicator being determined for every subband.

4. The method according to claim 3, further comprising the step of:
   attenuating every subband of the compressed difference signal whose noise component lies above a masked threshold of a signal component of a subband of an audio signal corresponding to that of the compressed difference signal so that the noise component of the subband of the compressed difference signal lies below a respective absolute value of masking.

5. The method according to claim 4, wherein a noise component of a subband of the compressed difference signal is determined by determining a noise power of the noise indicator of said subband.

6. A computer readable medium encoded with a computer program to cause a computer or digital signal processor to perform the method as defined in claim 1.

7. An FM receiver, comprising:
   an expander configured to expand a received compressed difference signal which is transmitted additionally within a received FM signal; and
   an additional denoising circuit configured to reduce a noise of the FM signal by using a noise indicator determined by subtracting a difference signal from the expanded compressed difference signal.

8. The FM receiver according to claim 7, wherein the additional denoising circuit performs a frequency selective stereo to mono blending by controlling an attenuation of subbands of the expanded compressed difference signal, one respective noise indicator being determined for every subband.

9. The FM receiver according to claim 8, wherein the additional denoising circuit comprises a comparison circuit configured to determine an attenuation factor for a respective subband of the expanded compressed difference signal by comparing a noise component of the subband to a signal component of a corresponding subband of an audio signal.

10. The FM receiver according to claim 9, further comprising:
    a noise power determination unit configured to determine the noise component of the subband of the compressed difference signal by determining a noise power of the noise indicator of said subband.

11. The FM receiver according to claim 9, further comprising:
    a signal power determination unit configured to determine the signal component of the subband of the audio signal on basis of a combination of a corresponding subband sum signal and a corresponding subband difference signal.

12. The FM receiver according to claim 9, further comprising:
    a signal power determination unit configured to determine the signal component of the subband of the audio signal on basis of a combination of a signal power of a corresponding subband sum signal and a signal power of the subband of the compressed difference signal.

13. A computer readable medium encoded with a computer program to cause a computer or digital signal processor to embody the FM receiver as defined in claim 7.

* * * * *